United States Patent [19]

Weiner et al.

[11] 4,199,032
[45] Apr. 22, 1980

[54] APPARATUS FOR MEASURING AND CONTROLLING A FORCE

[75] Inventors: Peter D. Weiner, Woodlands, Tex.; Charles W. Calhoun, Jackson, Wyo.

[73] Assignee: Weatherford/Lamb, Inc., Houston, Tex.

[21] Appl. No.: 878,643

[22] Filed: Feb. 17, 1978

[51] Int. Cl.$^2$ .................. B23Q 5/027; B23Q 5/033
[52] U.S. Cl. ..................................... 173/12; 173/139; 73/136 R; 73/761
[58] Field of Search ............... 173/12, 139; 73/88 F, 73/136 R, 139, 1 C, 761, 764, 765, 767; 81/52.5, 52.4 R

[56] References Cited

U.S. PATENT DOCUMENTS

| | | | |
|---|---|---|---|
| 2,771,579 | 11/1956 | Ruge | 73/765 X |
| 3,368,396 | 2/1968 | Van Burkleo et al. | 73/139 |
| 3,606,664 | 9/1971 | Weiner | 29/400 R |
| 3,745,820 | 7/1973 | Weiner | 73/139 |
| 3,797,305 | 3/1974 | Haskell | 73/1 C |
| 3,847,017 | 11/1974 | Watts | 73/765 |
| 3,920,082 | 11/1975 | Dudek | 173/12 |
| 3,975,954 | 8/1976 | Barnich | 73/139 |
| 4,006,784 | 2/1977 | Dudek | 173/12 |
| 4,008,773 | 2/1977 | Wallace et al. | 173/12 |
| 4,026,369 | 5/1977 | Vliet | 173/12 |
| 4,048,848 | 9/1977 | Dybel | 73/764 X |
| 4,059,005 | 11/1977 | Brendel et al. | 73/1 B |
| 4,060,137 | 11/1977 | Bickford | 173/139 |
| 4,091,451 | 5/1978 | Weiner et al. | 173/12 |

*Primary Examiner*—Lawrence J. Staab
*Attorney, Agent, or Firm*—Fulbright & Jaworski

[57] ABSTRACT

An apparatus for measuring and controlling a force such as torque, pull or weight. One example is an apparatus for making up two members having mating threaded connections, such as pipe joints, head bolts and all types of threaded fasteners for insuring that a specified torque has been applied. A comparator compares the measured torque with a desired torque value and disengages the making up of the joint when the measured torque exceeds the selected torque. A testing circuit is provided for applying a test value for testing the operation of the apparatus in the absence of actual measured torque. An adjustment circuit adjusts the output to conform with a known test value. An adjustment is provided to compensate for the length of the torque arm at which the torque measurement is made.

1 Claim, 2 Drawing Figures

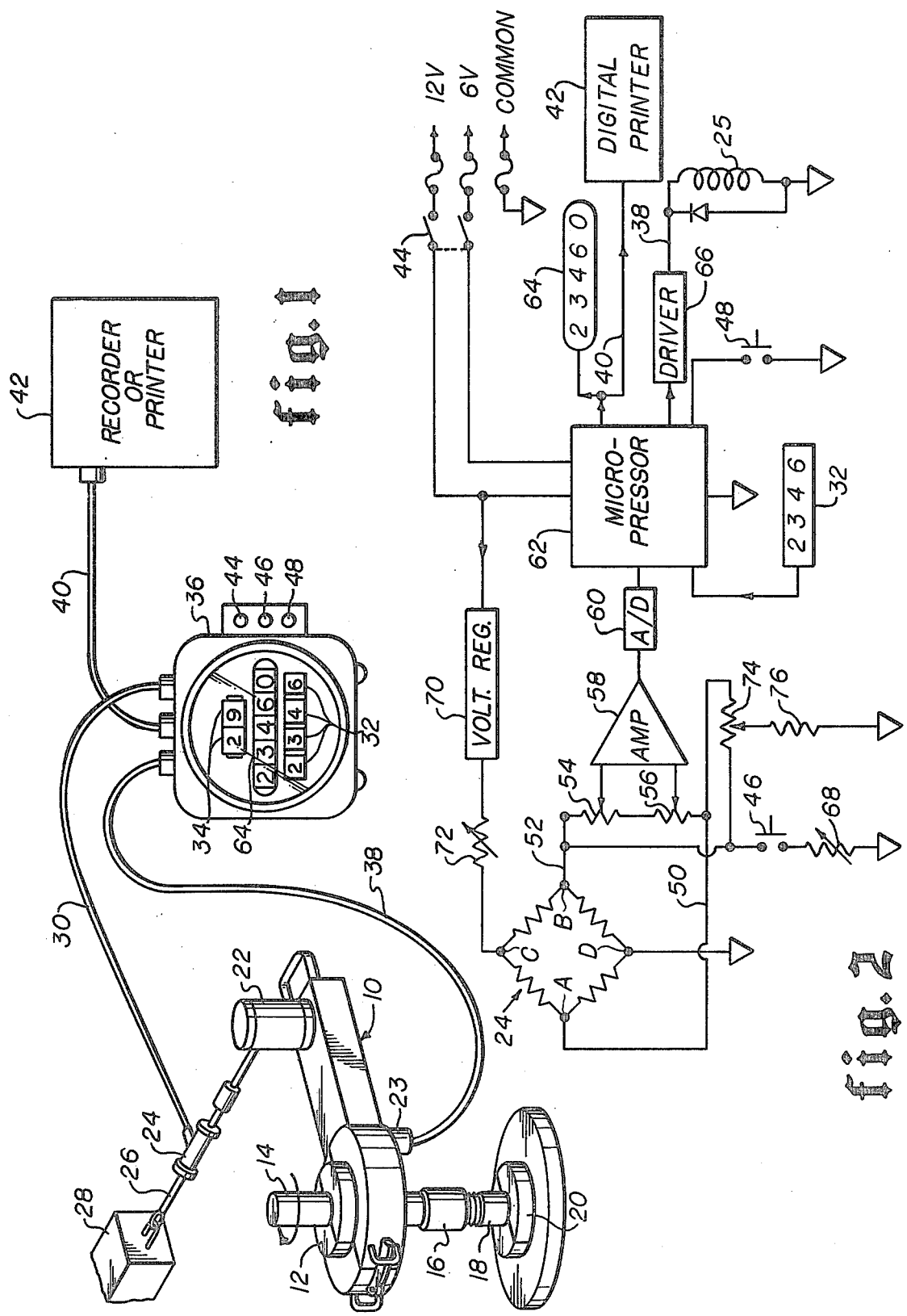

APPARATUS FOR MEASURING AND CONTROLLING A FORCE

BACKGROUND OF THE INVENTION

It is frequently desirable to measure a force, such as a compression, tension, torque or weight force, and control or limit the amount of force. For example, during drilling of oil and gas wells, sections of pipe, approximately 30 feet in length, are connected to form a longer length by thread engagement of the male end of the pipe into the female end of the next joint of pipe. It is necessary to apply a precalculated, but limited, amount of torque during the makeup to assure sufficient thread engagement and also effect a fluid tight seal. Power tongs, such as the LAMB Model 16,000, may be used for this operation and consist of jaws to firmly grip the pipe and hydraulic power to rotate the jaws. A back-up arm, to prevent rotation of the tong assembly, is tied to a corner leg of the derrick by a length of cable. The applied torque can then be monitored by inserting a tension measuring transducer in line with the back-up cable and the arm length times the tension is the applied torque.

In the past, a hydraulic system composed of a tension member, hydraulic connecting hose and a dial readout was the most popular device used. The operator observed the torque gauge and when sufficient torque was indicated, he manually shut off hydraulic tong power. Other prior art devices which indicate when a "bad joint" or a "good joint" has been made up are illustrated in U.S. Pat. Nos. 3,368,396; 3,606,664; and 3,745,820.

Another example of the use of a force measuring and controlling apparatus is for measuring and limiting the weight of a substance such as a batch of concrete.

SUMMARY

The present invention is directed to an apparatus for measuring, monitoring and controlling the magnitude of a force relative to a preset value. The present apparatus measures a varying force and compares the measured force with a preselected force value and provides a signal when the measured force equals the preselected force.

One object is the provision of an apparatus for making up two members having mating threaded connections to a specified preselected torque value and, when the desired torque value is reached, deactivating further makeup of the threaded connection.

Still a further object of the present invention is the provision of an automatic apparatus making up a threaded connection between two members having mating threads which includes means for measuring the torque as threaded connection is being made up and means for preselecting a desired torque value with a comparison means connected to the measuring means and selecting means for comparing the measured torque with the selective torque and providing a deactuating signal when the measured torque equals the selected torque for stopping the makeup of the threaded connection.

Still a further object of the present invention is the provision of testing means connected to the measuring means for applying a test value of force to the measuring means for testing the operation of the apparatus.

Still a further object of the present invention is the provision of adjusting means for adjusting the output of the measuring means to conform with the known test value applied to the measuring means.

Yet a still further object of the present invention is the provision of adjusting means connected to the torque measuring means for compensating for the torque arm distance at which the torque measuring means is connected to the power tongs whereby the apparatus may be utilized on various lengths of power tongs.

Other and further objects, features and advantages will be apparent from the following description of a presently preferred embodiment of the invention, given for the purpose of disclosure and taken in conjunction with the accompanying drawing.

BRIEF DESCRIPTION OF THE DRAWINGS

FIG. 1 is a schematic elevational view of the preferred embodiment of the invention, and FIG. 2 is an electrical schematic of the present invention.

DESCRIPTION OF THE PREFERRED EMBODIMENT

While the present invention is applicable to measuring and controlling various types of forces, it will be described in connection with joining one length of tubular goods to another such as casing, tubing or drill pipe normally used in the drilling or completion of oil wells.

Referring now to the drawings, and particularly to FIG. 1, means for rotating one member relative to the second member, such as power tongs, are generally indicated by the reference numeral 10 and include a rotatable jaw member 12 for gripping and rotating a first member of a well pipe string section, such as pipe section 14. The lower end of the pipe section 14 is shown being threaded onto a second member such as a pipe coupling 16 which is also threaded on the upper end of a second pipe section 18. The second pipe 18 is held stationary by slips in the rotary table 20. A tong prime mover 22, such as a hydraulic motor, is connected to the rotatable jaw member 12 by a drive mechanism (not shown) in a conventional manner. A solenoid actuated valve 23 may be connected in the hydraulic supply line to the motor 22 for controlling the actuating power to the motor 22.

A torque measuring transducer 24 is connected in a backup line 26 between a fixed support 28 and the power tongs 10 for preventing the tongs 10 from rotating during makeup of the threads. When the tongs are actuated, the jaws 12 rotate pipe 14 clockwise causing a threaded makeup with the coupling 16 and pipe 18.

As friction in the threaded connection increases, a corresponding increase in tension is detected by the transducer 24, and a voltage proportional to the tension is generated to an electrical circuit, which will be more fully described herinafter, through a line 30.

Prior to the beginning of the makeup of the threaded connection, a torque value is selected based upon knowledge gained through tests in actual field makeup and this preselected desired torque value is dialed into thumbwheel switches 32 in the housing 36, here shown as the number 2346. The straight tension pull in the transducer 24 must be multiplied by the tong arm length to provide a signal proportional to foot pounds torque. The tong arm length is the distance between the connection of the line 26 to the tongs and the threaded connections being made up. Thumbwheel switches 34 are provided in the electrical housing 36, and are adjusted to reflect the torque arm length, here shown as 29 inches, and which are in turn connected to a divider network which will be more fully described hereinafter.

An electrical circuit described in FIG. 2, monitors the measured torque and compares the measured torque shown in readout 64 against the preselected torque value set in the thumbwheel switches 32 and when they become equal a de-energizing signal is sent out over line 38 to solenoid valve 23, removing hydraulic power from the power tong 10 and stopping further makeup of the threaded connection. The final torque value is also directed through a conductor 40 to a recorder or printer 42 for providing a permanent record of the torque makeup of each threaded connection. Attached to the electrical housing 36 are an off/on switch 44, a test switch 46 and a zero/reset switch 48.

Referring to FIG. 2, the torque transducer 24 preferably includes four resistor strain gauges connected in a Wheatstone bridge configuration. As tension is applied, the Wheatstone bridge becomes unbalanced proportional to the applied load. The unbalance produces an output voltage signal between points A and B of bridge 24 proportional to the applied load. The measured torque signal is transmitted through conductors 50 and 52 through a torque arm selector circuit which includes two resistance voltage dividers 54 and 56 that are adjusted in steps so that division may be accomplished from one inch arm to 100 inch arm length in one inch steps. Thus, the divider 54 may be nine 1000 ohm resistors connected in series and the divider 56 may include ten 100 ohm resistors connected in series. If the junction between the resistors is connected to a multipoint switch, and the divider 54 represents 10% steps and the divider 56 would represent 1% steps. The voltage divider 54 and 56 may be controlled by the thumbwheel switches 34 to feed in the proper torque arm length to provide a proper conversion of the tension measurement to torque measurement. For a given tension pull, such as 1000 pounds, and a five foot torque arm (60 inches) the torque would be 5000 foot pounds and the thumbwheel switches 34 would be adjusted to read 60. The torque arm selection therefore is a linear function and a standard voltage device may be utilized to provide the desired conversions. The signal from the torque arm selector circuit is supplied to the input of amplifier 58 which may be any differential amplifier that meets the general requirements as to stability and linearity. The output of amplifier 58 is transmitted through an analog to digital converter 60 where the amplified analog measured torque signal is transformed to a digital value.

The measured torque signal is then transmitted to a comparator such as a standard digital microprocessor 62. Similarly, the preselected desired torque value as set in the thumbwheel switches 32 is also fed to the comparator 62. The comparator or microprocessor 62 compares the selected torque value on the thumbwheel switches 32 against the measured torque value which is also being displayed on readout 64. If the measured torque amount is equal or greater than the preselected desired torque value, then a deactivating signal is generated in the output of the microprocessor 62 and transmitted through a driver assembly 66 and to the coil 25 of solenoid actuated valve 23 to deactuate the hydraulic motor 22 for removing applied torque since the threaded connection has reached its desired torque value. The deactuation of the motor 22 may be accomplished by utilizing the solenoid actuated valve 23 as a bypass valve to the motor 22 or other suitable mechanism.

The recorder or printer 42 is continuously updated as the measured torque is detected and when the torque preset value is reached, a print command is generated in the microprocessor 62 and this value is printed and may be used for a permanent record.

Another feature of the present invention is the provision of a testing circuit which when the testing switch 46 is actuated, and in the absence of an actual measured torque signal, applies a test torque signal to the electrical circuit for verifying that the equipment is in good working order. By depressing a switch 46, a precision resistor 68 of known value is placed in parallel with one leg of the Wheatstone bridge which reduces the resistance value between the points D and B of the Wheatstone bridge 24. This unbalance simulates an applied tension pull to the degree desired by the adjustment of the potentiometer 68. The lower the resistance of potentiometer 68, the greater the simulated tension value. Preferably, potentiometer 68 is set at the factory and sealed to represent a known tension amount, for example, 10,000 pounds pull. If the torque arm is set for 29 inches (2.417 feet), then a signal equivalent to 24,170 foot pounds is generated and displayed on the readout 64. If the preset value set in the thumbwheel switches 32 is less than the test value, then solenoid 23 would be actuated when the test button 46 is actuated. In this case, the test signal would also send a print command to the recorder 42 and the test signal would be printed. This simplified test procedure may be conducted by an operator unskilled in electronic knowledge and assures the operator that all circuits are operational.

A voltage regulator 70 is provided to maintain a constant voltage to the bridge circuit 24 in the event the supply voltage varies. The bridge sensitivity would vary in unison with the supply voltage changes if this circuit were not used since the bridge 24 output is proportional to the input voltage and would vary if the supply voltage amount changes. If, for any reason, the circuit output changes due to temperature variations or any other reasons, such as temperature changes in the analog amplifier 58, a span potentiometer 72 is actuated at the same time the test switch 46 is actuated and varied until the readout 64 indicates the value corresponding to the test value set by potentiometer 68. This action occurs because the signal output from the bridge 24 is proportional to the applied voltage and the span potentiometer 72 and bridge 24 are in effect a voltage divider network. As the potentiometer 72 resistance value is increased, the voltage across bridge 24 is decreased and the signal voltage produced is less.

In addition, a zero potentiometer 74 and resistor 76 are provided to balance the bridge 24 when no actual load or test load is applied thereto. Rotation of the potentiometer 74 varies the value across bridge 24 legs A-D or B-D according to the location of the wiper arm of the potentiometer 74. If the wiper arm is in the exact center an equal shunt is applied across both legs then no adjustment is present. The adjustment provided for by potentiometer 74 allows the operator, when no load is applied, to adjust for minor circuit unbalances and make the readout display 64 read zero foot pounds. Resistor 76 is selected to desensitize the circuit so that the adjustment is simple.

An off/on switch 44 applies or removes power to the circuit.

In operation, the thumbwheels 34 are preset to correspond to the torque arm or distance between the connection of cable 26 to the power tongs 10 and the members which are being threaded, for example 29 inches as indicated in FIG. 1. In addition, a preselected desired torque value, for example 23,460 foot-lbs, based upon prior experience, is preset in the thumbwheels 32 to provide the torque value, 2346 as shown in the drawing, which should be applied to the threaded joints to properly make up the threaded connection. The tongs 10 then rotate the one member 14 relative to another member 16 for making up the threaded connection and the torque measuring transducer bridge circuit 24 measures the torque applied to the threaded connection. The comparator 62 compares the applied measured torque against the preselected value set in the thumbwheel switches 32 and when they are equal provides a deactuating signal to the solenoid valve 23 to remove hydraulic power from the motor 22 and deactuate the power tongs 10. At any time when torque is not being applied to a threaded connection, the test circuit may be utilized by depressing switch 46 to apply a test torque value to the circuit for verifying that the circuit is in good working order. Potentiometers 72 and 74 may be utilized when necessary to adjust the circuit output to overcome any circuit unbalances.

As has been indicated, the present apparatus can be used for measuring weight on a direct force attached to the transducer 24. In such a case, the thumbwheels 34 would be set at "12". For example, in weighing a batch of material such as the amount of concrete being poured into a container connected to transducer 24, the present device could turn off the concrete input when the weight of concrete reached the preset value dialed into the thumbwheels 32.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. An apparatus for making up a threaded connection between two members having mating threads comprising,
   means for rotating one member relative to the second member,
   torque measuring transducer means connected to the rotating means at a distance from the first and second members and providing an output voltage signal proportional to the torque, said transducer including a Wheatstone bridge circuit,
   an analog to digital converter connected to the output of the bridge circuit for converting the torque measurement signal to a digital signal,
   switch means for selecting a desired torque value,
   digital comparison means connected to the output of the converter and to the switch means for comparing the measured torque with the selected torque and providing a deactuating signal when the measured torque equals the selected torque,
   deactuation means connected between the comparison means and the rotating means for deactuating the rotating means when a deactuating signal is received from the comparison means, and
   a torque arm adjusting resistance connected to the output of the bridge circuit for compensating for the distance that the torque transducer connection to the rotating means is from the first and second members.

* * * * *